United States Patent
Moffitt, Jr.

(10) Patent No.: US 9,856,131 B1
(45) Date of Patent: *Jan. 2, 2018

(54) REFUELING METHOD FOR SUPPLYING FUEL TO FRACTURING EQUIPMENT

(71) Applicant: Roy Malcolm Moffitt, Jr., Cypress, TX (US)

(72) Inventor: Roy Malcolm Moffitt, Jr., Cypress, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,614

(22) Filed: May 24, 2016

Related U.S. Application Data

(63) Continuation of application No. 14/856,533, filed on Sep. 16, 2015, now Pat. No. 9,371,831.

(60) Provisional application No. 62/051,185, filed on Sep. 16, 2014.

(51) Int. Cl.
| | | |
|---|---|---|
| *B67D 7/52* | (2010.01) | |
| *F16K 5/06* | (2006.01) | |
| *B67D 7/04* | (2010.01) | |
| *E21B 43/26* | (2006.01) | |

(52) U.S. Cl.
CPC ............... *B67D 7/52* (2013.01); *B67D 7/04* (2013.01); *F16K 5/06* (2013.01); *E21B 43/26* (2013.01)

(58) Field of Classification Search
CPC ... B67D 7/04; B67D 7/52; B67D 7/58; B67D 7/0401; B67D 2007/0426; F04B 47/04; F04B 53/10; F04B 49/225
USPC .......................................................... 141/67
See application file for complete search history.

(56) References Cited

U.S. PATENT DOCUMENTS

| | | |
|---|---|---|
| 3,028,010 A | 4/1962 | Headrick |
| 3,111,968 A | 11/1963 | Headrick |
| 3,807,433 A | 4/1974 | Byrd |
| 4,139,019 A | 2/1979 | Bresie |
| 5,127,230 A | 7/1992 | Neeser et al. |
| 5,243,821 A | 9/1993 | Schuck et al. |
| 5,360,139 A | 11/1994 | Goode |
| 5,505,232 A | 4/1996 | Barclay |
| 5,590,535 A | 1/1997 | Rhoades |
| 6,152,197 A | 11/2000 | Gerardot |
| 6,450,217 B2 | 9/2002 | Mutter |
| 6,945,288 B1 | 9/2005 | Brakefield et al. |
| 7,135,048 B1 | 11/2006 | Edlund et al. |
| 7,628,182 B2 | 12/2009 | Poulter |
| 7,938,151 B2 | 5/2011 | Hockner |
| 8,245,889 B1 | 8/2012 | Starns |

(Continued)

*Primary Examiner* — Timothy L Maust
(74) *Attorney, Agent, or Firm* — Rao DeBoer Osterrider, PLLC; Dileep P. Rao

(57) ABSTRACT

A refueling method for supplying fuel to at least one piece of fracturing equipment by installing a main fuel source at a fractionation operation, connecting the main fuel source to fracturing equipment to provide downhole fluids to the well, and connecting at least one pressurization unit to the main fuel source. The method includes using a valve element to stop fuel flow from the fuel tank when the main fuel source supplies the fuel to the supply coupling device and allows fuel flow from the fuel tank to the at least one pressurization unit when a system failure prevents the main fuel source from supplying fuel to the supply coupling device and using the return fuel line with the return coupling device for the transfer of the fuel to the fuel tank when a system failure prevents the main fuel source from supplying the fuel to the supply coupling device.

12 Claims, 9 Drawing Sheets

(56) References Cited

U.S. PATENT DOCUMENTS

| | | |
|---|---|---|
| 8,511,351 B2 | 8/2013 | Watkins et al. |
| 8,905,056 B2 | 12/2014 | Kendrick |
| 9,371,830 B2 * | 6/2016 | Moffitt, Jr. ............ F04B 49/225 |
| 9,371,831 B2 * | 6/2016 | Moffitt, Jr. ............ F04B 49/225 |
| 2002/0188382 A1 | 12/2002 | Sherwood |
| 2005/0199312 A1 | 9/2005 | Wiens |
| 2006/0118201 A1 | 6/2006 | Li et al. |
| 2008/0223660 A1 | 9/2008 | Williams et al. |
| 2008/0277018 A1 | 11/2008 | Worswick et al. |
| 2010/0089486 A1 | 4/2010 | Koeninger et al. |
| 2010/0108179 A1 | 5/2010 | Emerson, Jr. |
| 2011/0048572 A1 | 3/2011 | Batson et al. |
| 2011/0197988 A1 | 8/2011 | Van Vliet et al. |
| 2013/0112313 A1 | 5/2013 | Donnelly et al. |
| 2014/0090742 A1 | 4/2014 | Coskrey et al. |
| 2014/0174599 A1 | 6/2014 | Porcile |

\* cited by examiner

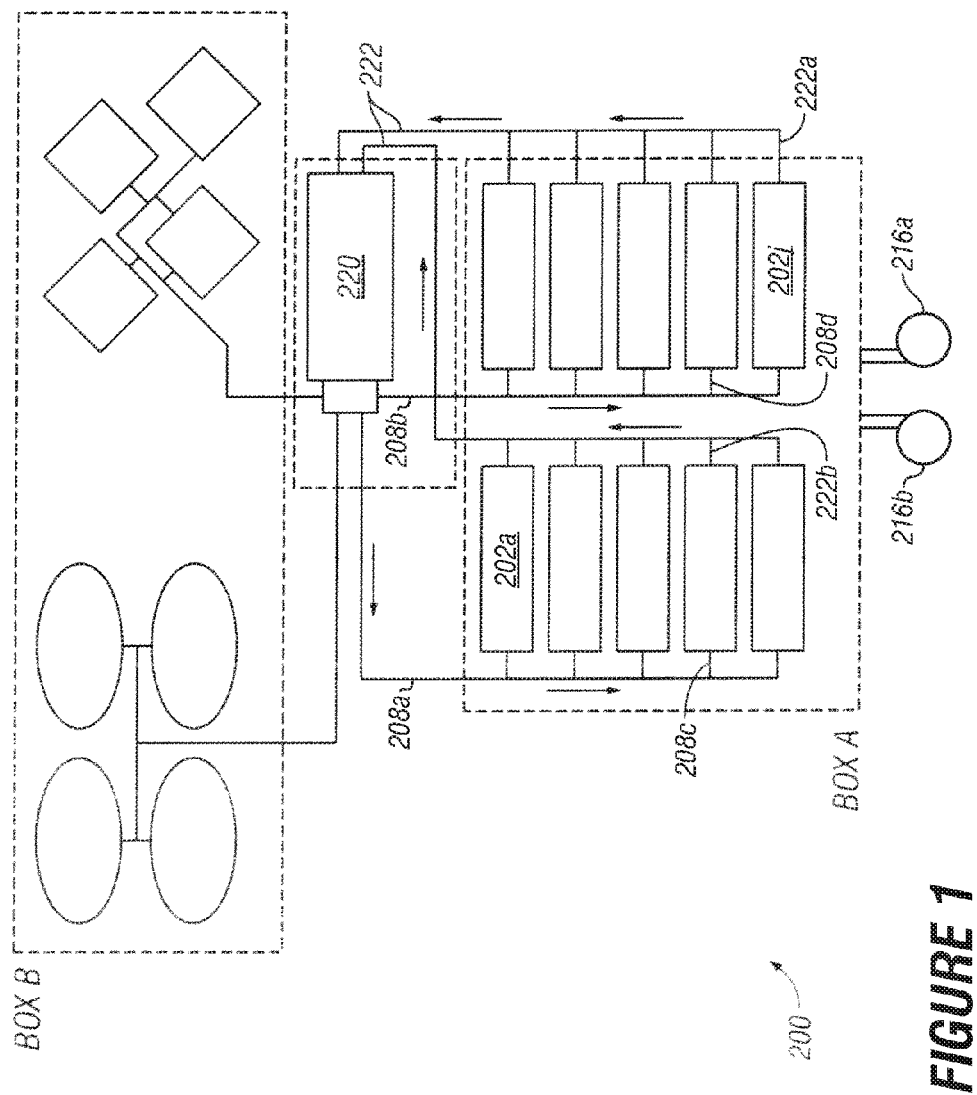

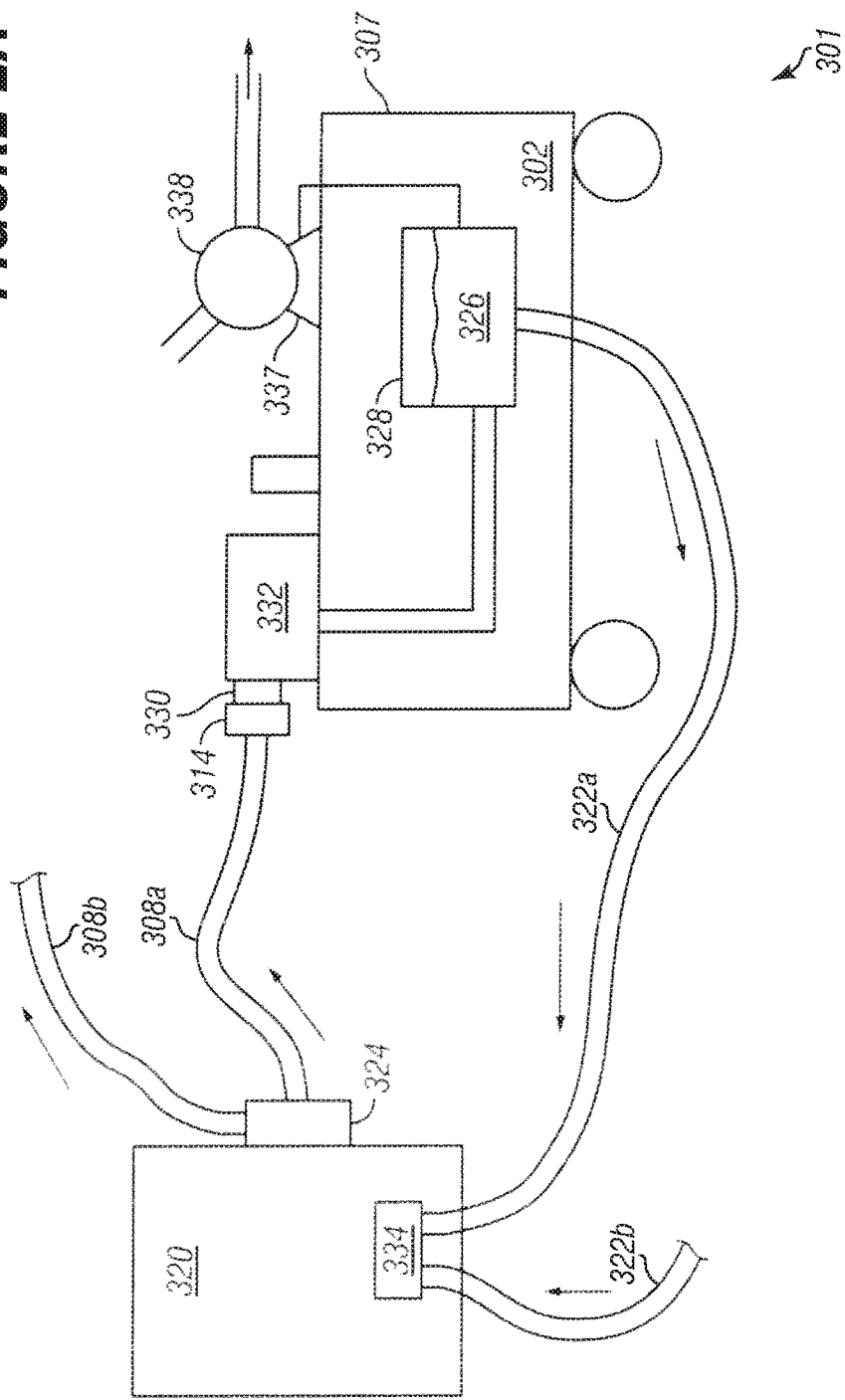

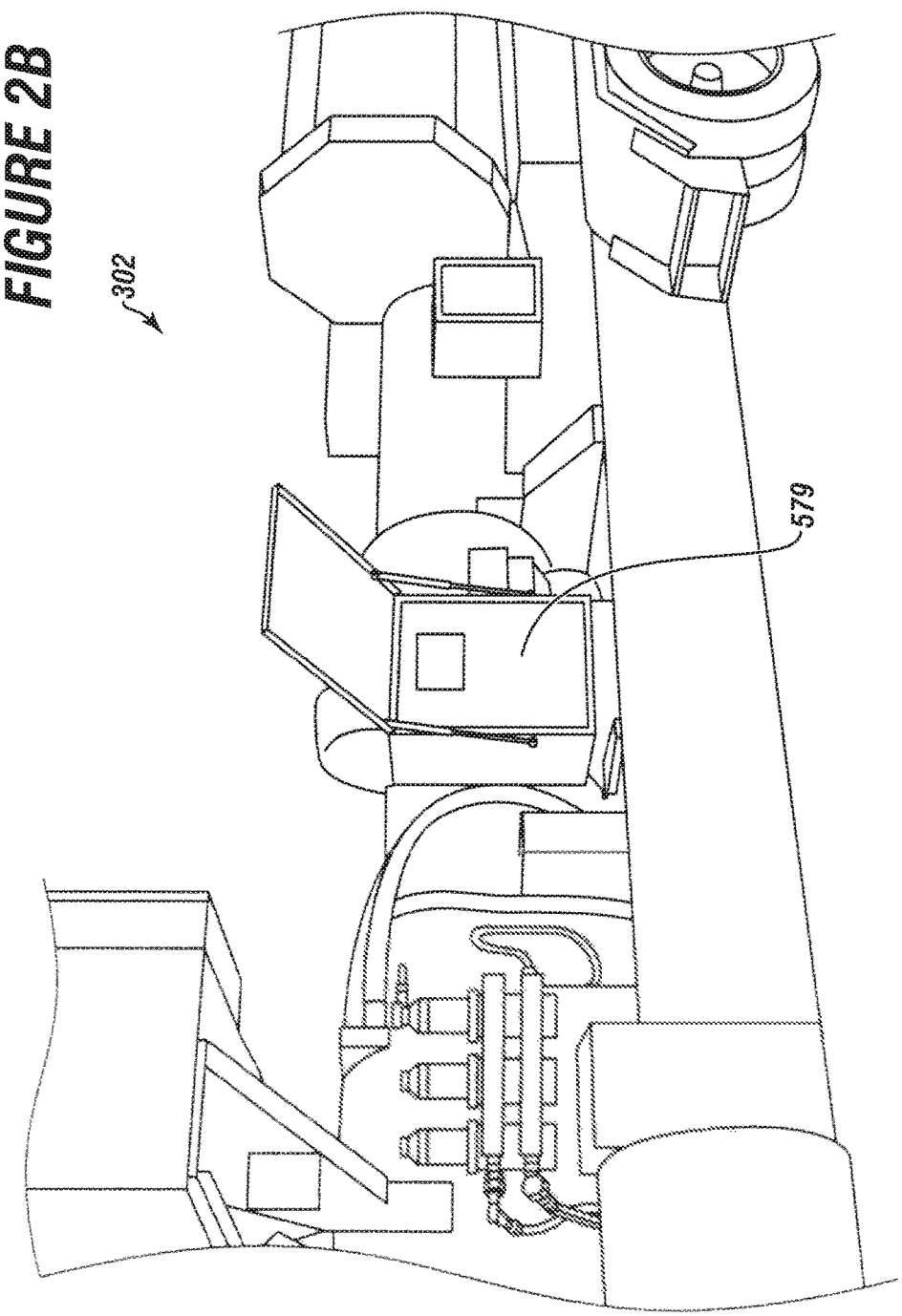

FIGURE 7

| | |
|---|---|
| INSTALLING A MAIN FUEL SOURCE, CONTAINING FUEL, AT A FRACTIONATION OPERATION | 500 |
| FLUIDLY CONNECTING THE MAIN FUEL SOURCE TO AT LEAST ONE PIECE OF FRACTURING EQUIPMENT, WHEREIN THE FRACTURING EQUIPMENT CAN PROVIDE DOWNHOLE FLUIDS TO A WELL | 502 |
| FLUIDLY CONNECTING AT LEAST ONE PRESSURIZATION UNIT TO THE MAIN FUEL SOURCE | 504 |
| USING THE VALVE ELEMENT TO STOP THE FUEL FLOW FROM THE FUEL TANK WHEN THE MAIN FUEL SOURCE SUPPLIES THE FUEL TO THE SUPPLY COUPLING DEVICE AND ALLOWS THE FUEL FLOW FROM THE FUEL TANK TO THE PUMP WHEN A SYSTEM FAILURE PREVENTS THE MAIN FUEL SOURCE FROM SUPPLYING THE FUEL TO THE SUPPLY COUPLING DEVICE | 506 |
| USING THE RETURN FUEL LINE WITH THE RETURN COUPLING DEVICE FOR THE TRANSFER OF THE FUEL TO THE FUEL TANK WHEN A SYSTEM FAILURE PREVENTS THE MAIN FUEL SOURCE FROM SUPPLYING THE FUEL TO THE SUPPLY COUPLING DEVICE | 508 |

REFUELING METHOD FOR SUPPLYING FUEL TO FRACTURING EQUIPMENT

CROSS REFERENCE TO RELATED APPLICATIONS

The current application is a Continuation of U.S. patent application Ser. No. 14/856,533 filed on Sep. 16, 2015, entitled "REFUELING METHOD FOR SUPPLYING FUEL TO HYDRAULIC FRACTURING EQUIPMENT", which claims priority to and the benefit of U.S. Provisional Patent Application Ser. No. 62/051,185 filed Sep. 16, 2014, the entirety of which being incorporated herein by reference for all purposes.

FIELD

The present embodiments generally relate to operations and processes used in the oil and gas industry. The present embodiments further relate to a fractionation process using an improved method and system for refueling one or more pieces of equipment.

BACKGROUND

There are needs for a refueling method that supplies fuel to multiple fractionation pump units simultaneously to increase safety in the field and save time refueling.

There is a need for reducing the time involved with refueling. There is a need for recapturing unused fuel in order to reduce fuel costs.

The present embodiments meet these needs.

BRIEF DESCRIPTION OF THE DRAWINGS

The detailed description will be better understood in conjunction with the accompanying drawings as follows:

FIG. 1 is a block diagram overview of a fractionation operation using the refueling method according to one or more embodiments.

FIG. 2A is a side view of a coupling device as a connection between a main fuel source and at least one pressurization unit according to one or more embodiments.

FIG. 2B is a side perspective view of at least one pressurization unit with a controller according to one or more embodiments.

FIG. 7 is a diagram of a method for supplying fuel to equipment according to one or more embodiments.

Figure 3A:
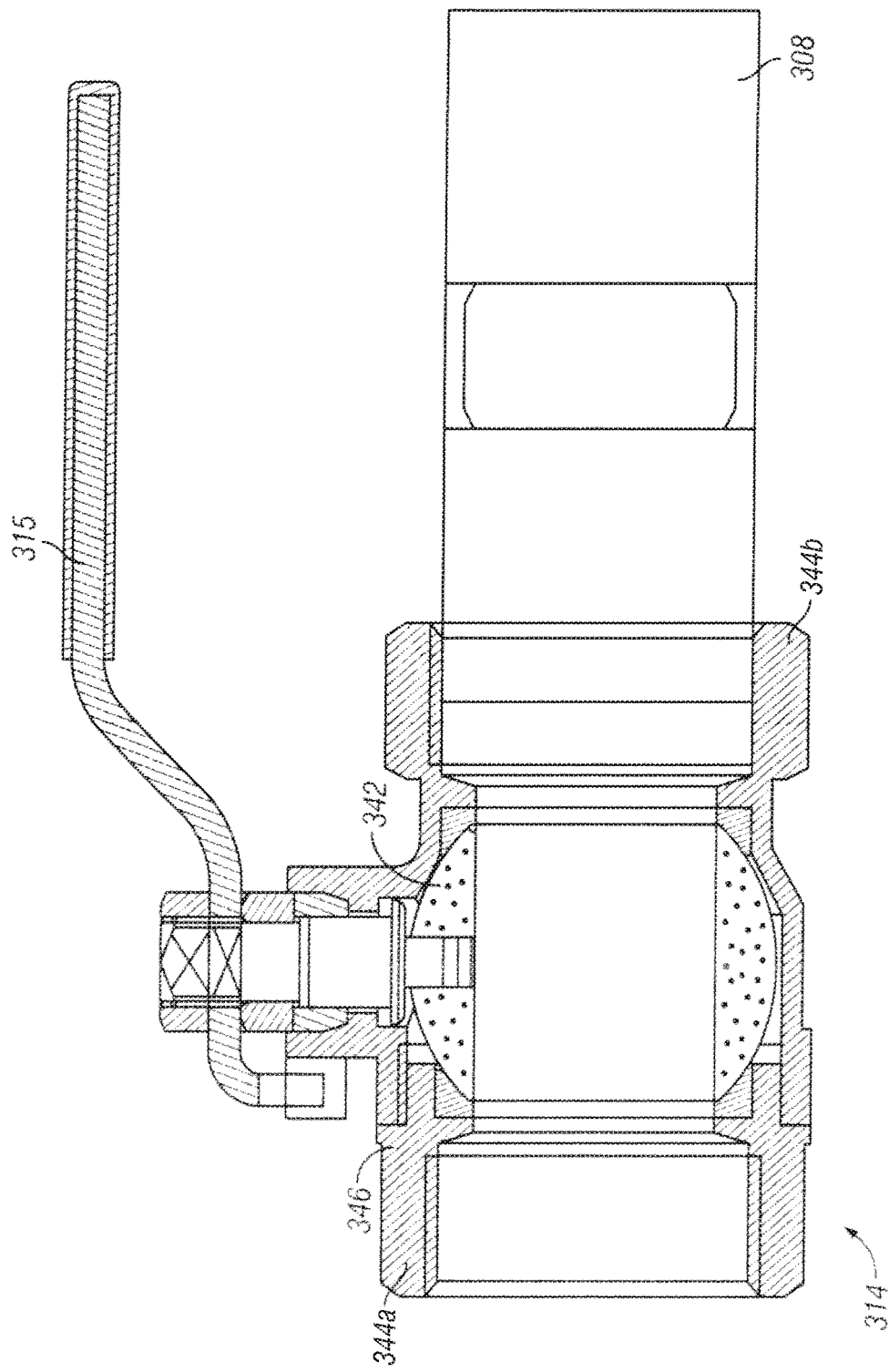
FIG. 3A is a cross-sectional view of a supply coupling device according to one or more embodiments.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments generally relate to operations and processes used in the oil and gas industry. The present embodiments further relate to a method and system for using an improved method and system for refueling one or more pieces of equipment.

Hydraulic fracturing as used herein can also be referred to and interchangeable with the terms fractionation, hydrofracturing, hydrofracking, fracking, fraccing, and frac, which refers to a technique in which rock is fractured by a pressurized liquid. The process involves the high-pressure injection of fracking fluid, which can consist primarily of water, containing sand and other proppants suspended with the aid of thickening agents, into a wellbore to create cracks in the formations through which natural gas, petroleum, and brine can flow more freely.

Embodiments of the disclosure pertain to a refueling method for a fractionation operation with multiple pieces of fracturing equipment, such as trailers, simultaneously without a hot zone, that can include at least one pressurization unit configured to provide pressurized fluid to a well, the unit having an optional pump, a motor, and a motor fuel source, a supply coupling device and a return coupling device, a main fuel source can be configured to provide fuel to the motor fuel source, a supply fuel line configured to provide fuel transport from the main fuel source to the motor fuel source, and a return fuel line can be configured to provide fuel transport from the at least one pressurization unit to the main fuel source.

In embodiments, the fracturing equipment can be hydraulic fracturing equipment.

While persons having ordinary skill in the art are well aware of using pumps for fluid transfer, certain applications may lend themselves to gravity feeding fluids in lieu of pumping. As such, it will be readily apparent that a pump is optional for use only when necessary.

An oil or gas well can includes a wellbore extending into a subterranean formation at some depth below a surface (e.g., Earth's surface), and can be usually lined with a tubular, such as casing, to add strength to the well. Many commercially viable hydrocarbon sources are found in "tight" reservoirs, which mean the target hydrocarbon product cannot be easily extracted. The surrounding formation (e.g., shale) to these reservoirs typically has low permeability, and it is uneconomical to produce the hydrocarbons (i.e., gas, oil) in commercial quantities from this formation without the use of drilling accompanied with fractionation operations.

Fractionation is common in the industry and growing in popularity and general acceptance, and can include the use of a plug set in the wellbore below or beyond the respective target zone, followed by pumping or injecting high pressure fracking fluid into the zone. The fractionation operation results in fractures or "cracks" in the formation that allow hydrocarbons to be more readily extracted and produced by an operator, and can be repeated as desired or necessary until all target zones are fractured.

In a conventional fracturing operation, "slurry" of fluids and additives can be injected into a hydrocarbon bearing rock formation at a wellbore to propagate fracturing. The fluids, which can be mixed with chemicals, sand, acid, can be pressurized and transported at a high rate via one or more high pressure pumps, typically driven by diesel fueled prime movers/motors. The majority of the fluids injected will flow back through the wellbore and be recovered, while the sand will remain in the newly created fracture, thus "propping" it open.

The term "automatically controlled" as used herein can refer to operation of equipment of the refueling system using a controller, which can be made up of a processor and a data storage, or by another remote device connected to the equipment of the refueling system, such as by a network. The remote device can be a computer, a laptop, a cellular phone, a smart phone, a tablet computer, or similar device.

The term "fractionation operation" as used herein can refer to fractionation of a downhole well that has already been drilled.

The term "fuel" as used herein can refer to the fuel that drives the motors of the fracturing equipment.

The term "land based fractionation operation" as used herein can refer to a fractionation operation which occurs around a land based well.

The term "pump" as used herein can refer to a fuel pump with the capacity to flow fuel at a rate from 150 gallons per minute to 225 gallons per minute from 28 psi to 40 psi. In embodiments, the pump can be removed and the fuel from the supply coupling device can be gravity fed to the onboard motor.

The term "manually controlled" as used herein can refer to valves or equipment which can be operated by pushing a button or using a wrench to turn, or flipping a switch.

The term "motor" as used herein can refer to an engine such as a combustion engine mounted on the fracturing equipment or trailer having the at least one pressurization unit, the fracturing equipment or trailer providing fuel to allow multiple hydraulic equipment and multiple trailers and/or trucks to simultaneously hydraulically fractionate a formation through an existing wellbore.

A benefit of the method can be to eliminate hot refueling by operators, such as truck operators, allowing operators to extend uninterrupted and extended pump times for fractionation operations.

Explosions and death often happen with hot refueling. These embodiments can save lives by eliminating the need for personnel to be in the hot zone for hot refueling activities.

The embodiments can have the benefit of eliminating human error that causes fires during hot refueling by eliminating the need for hot refueling of multiple pieces of fracturing equipment simultaneously.

In traditional hot refueling, in the hot zone, one person can have a fire extinguisher with the fuel nozzle, a second person can be in the hot zone with line of sight to the person refueling with the fire extinguisher, and then a third person can be back on the truck with his finger on the emergency stop button.

The present embodiments can save the lives of people, by no longer requiring them to be in the field in this "hot zone" for hot refueling.

Herein disclosed are novel apparatuses, systems, and methods that pertain to a refueling method for a fractionation operation, details of which are described herein.

Embodiments of the present disclosure are described in detail with reference to the accompanying Figures. In the following discussion and in the claims, the terms "including" and "comprising" can be used in an open-ended fashion, such as to mean, for example, "including, but not limited to". While the disclosure may be described with reference to the relevant apparatuses, systems, and methods, it should be understood that the disclosure cannot be limited to the specific embodiments shown or described. Rather, one skilled in the art will appreciate that a variety of configurations can be implemented in accordance with embodiments herein.

Although not necessary, like elements in the various figures can be denoted by like reference numerals for consistency and ease of understanding. Numerous specific details are set forth in order to provide a more thorough understanding of the disclosure; however, it can be apparent to one of ordinary skill in the art that the embodiments disclosed herein can be practiced without these specific details. In other instances, well-known features have not been described in detail to avoid unnecessarily complicating the description. Directional terms, such as "above," "below," "upper," "lower," "front," "back,", are used for convenience and to refer to general direction and/or orientation, and are only intended for illustrative purposes only, and not to limit the disclosure.

Connection(s), couplings, or other forms of contact between parts, components, and so forth can include conventional items, such as lubricant, additional sealing materials, such as a gasket between flanges, PTFE between threads, and the like. Embodiments of the disclosure provide for one or more components to be new, used, and/or retrofitted to existing machines and systems.

Turning to the Figures, FIG. 1 is a block diagram overview of a fractionation operation using the refueling method according to one or more embodiments.

Although FIG. 1 shows a land-based operation, it is within the scope of the disclosure that embodiments herein can be just as applicable to a subsea fractionation operation.

FIG. 1 shows an operation 200, as a fractionation operation.

The refueling system useable with the operation 200 can be identified with reference to Box A.

Box A can be connected to at least one well 216a and 216b through piping.

In this embodiment, a plurality of pressurization units 202a-202j are shown.

In embodiments, the at least one pressurization unit, for example, can be a frac pump truck or a frac pump trailer.

A plurality of pressurization units 202a-202j can each include various components or subcomponents, such as an optional pump, a motor, and a fuel tank. In embodiments, the fuel tank can be a motor fuel tank.

A main fuel source 220 can provide fuel to at least one pressurization unit or to a plurality of pressurization unit(s) 202a-202j simultaneously.

In embodiments, the fuel can be or include but is not limited to gasoline, kerosene, diesel, and natural gas. The fuel can be any suitable fuel. Moreover, the fuel need not be 100 percent in perfect composition, as impurities, compounds, or other components can be present.

The refueling method can include one or more supply fuel lines, supply fuel lines 208a, 208b, 208c, and 208d are shown.

Each supply fuel line 208a-208d can be configured to provide fuel from the main fuel source 220 to the at least one pressurization unit 202a-202j.

The refueling system can include one or more return fuel lines. Two of the return fuel lines 222a and 222b can be configured to provide fuel transport return from the at least one pressurization unit 202a-202j to the main fuel source 220.

Box B shows ancillary equipment supporting the fracturing equipment, such as trailers. The ancillary equipment can be sand, chemical blenders, equipment for the crosslinking of gels, and combinations thereof.

FIG. 2A shows a component connection view of a refueling system 301 having a fuel tank 328 with fuel 326 connected to at least one pressurization unit 302 according to one or more embodiments.

The refueling system 301 can be constructed of a number of interconnected and/or interoperable components, sub-components, and so forth. The refueling system 301 can include similar components and materials of construction as described for other embodiments herein, such that there can be similarity or exactness between them, however, the systems need not be identical.

The at least one pressurization unit 302 can include other components, that receive fuel, such as a pump 338, a motor (motor-generator) or prime mover 337 fluidly connected to the pump, a fuel level sensor (not shown), and a filter 332 or filtration system.

The at least one pressurization unit 302 can be disposed on or otherwise associated with (including operatively associatively) a frame 307 or similar support structure, the frame can be a skid, a trailer, or a truck.

The motor 337 can be or otherwise include a combustion (e.g., internal combustion) engine. The motor can burn fuel 326 to produce a mechanical motion, such as rotation. In this manner, the motor can be coupled (such as mechanically) to the pump 338 in such a way as to transmit mechanical rotation and drive the pump 338. Although the at least one pressurization unit 302 is discussed herein with reference to a motor, one of skill in the art would appreciate that there can be other devices suitable to provide energy in a manner that drives the pump 338.

A supply coupling device 314 can be connected to the filter 332 and to the fuel tank 328.

In embodiments, the supply coupling device 314 can be connected by way of threaded connection to the filter 332 or filtration system. The supply coupling device 314 can be connected to other components between the fuel tank 328 and the motor 337.

The supply coupling device 314 can be configured for manual control, automatic control, or combinations thereof. In this respect, the supply coupling device 314 can be configured with various flowthrough positions, such as an open position, a closed position, or a controlled position somewhere in between the open position and the closed position. In the digital control sense, this supply coupling device, can be a valve, and can have an "on" or an "off" position.

The fuel tank 328 can be configured in a manner so that the fuel 326 can be provided to the motor 337, such a through flow channel, piping, or similar tubing.

A main fuel source 320 can be configured in a manner so that the fuel 326 can be provided to the fuel tank 328, such as through one or more supply fuel lines 308a.

Another supply fuel line 308b is shown and can flow from the main fuel source 320 to provide fuel transport from the main fuel source 320 to at least one piece of fracturing equipment.

A return fuel line 322a can be configured to provide fuel transport from the at least one pressurization unit 302 to the main fuel source 320 via a return inlet 334.

A manifold 324 can be connected to the main fuel source to split and divide the fuel into one or more supply fuel lines 308a and 308b. In embodiments, there can be a manifold for the return fuel lines 322a and 322b.

A pressurization unit fuel inlet 330 is also depicted for flowing fuel from the supply coupling device 314 to the filter 332.

FIG. 2B is a side perspective view of at least one pressurization unit with a controller according to one or more embodiments.

The at least one pressurization unit 302 is shown with a controller 579.

The controller 579 can include at least one processor connected to sensors in at least one supply fuel line, in at least one return fuel line, or both. The sensors can detect flow rate information and pressures information and transmit the information to the processor.

The processor can compare the flow rate information and the pressure information to preset limits, and transmit a message when the flow rate information and the pressure information falls below or exceeds the preset limits to adjust rates of operation.

In embodiments, the message can be sent to a client device via a network to enable a user to adjust rates of operation.

In embodiments, the controller, the client device, or both the controller and the client device can be used to automatically actuate the valve element to change the flow of fuel from returning to the main fuel source to the fuel tank.

Figure 3B:
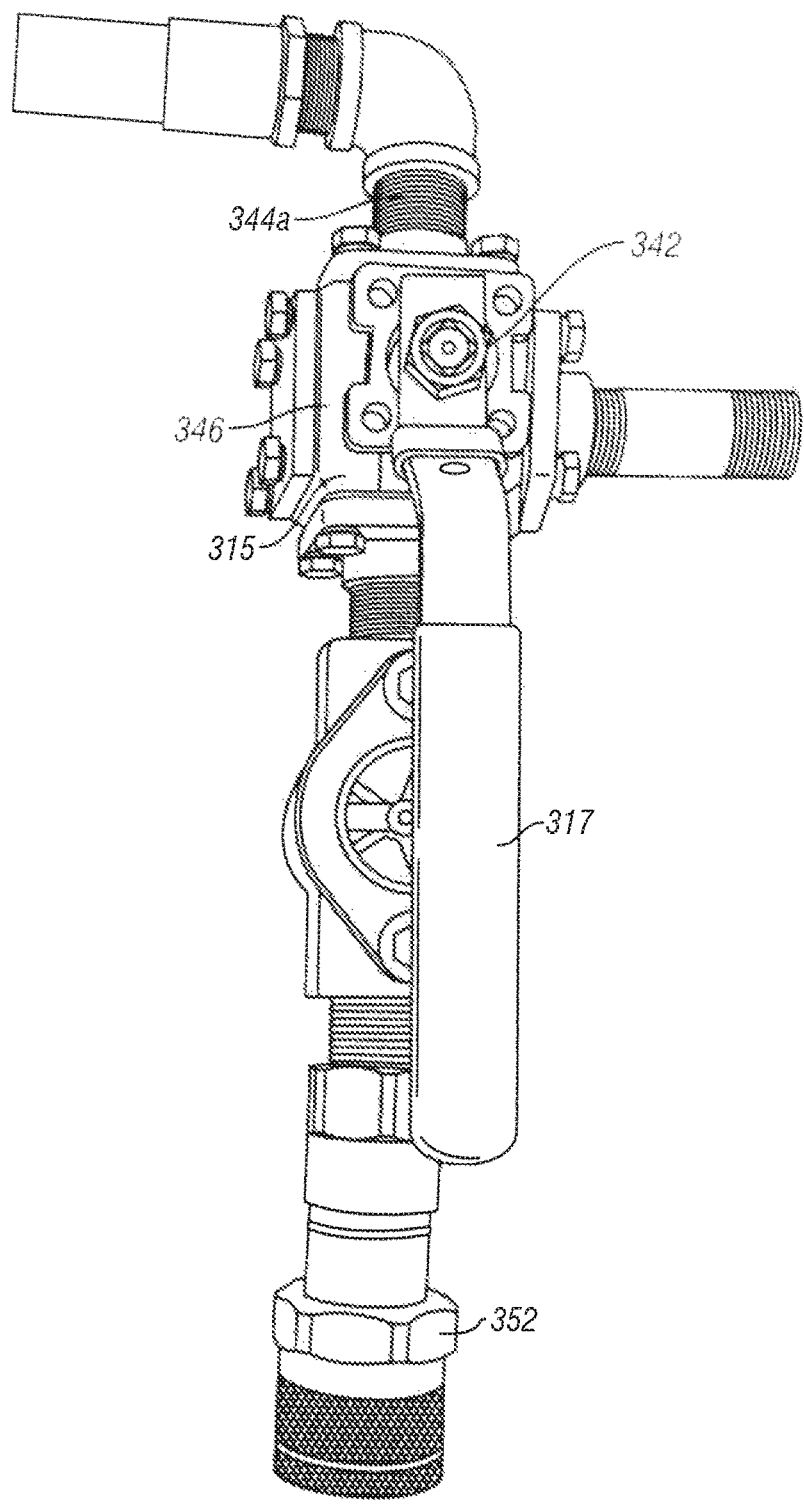
FIG. 3B is a perspective side view of a return coupling device according to one or more embodiments.

FIG. 3A is a cross sectional view of a supply coupling device 314 according to one or more embodiments. FIG. 3B is a perspective side view of a return coupling device 315 according to one or more embodiments.

The supply coupling device 314 can include a valve element 342 that can connect to the one or more supply fuel lines 308. In embodiments, the valve element 342 can be a valve with a spherical disc, a ball valve, a check valve, or another configuration or element suitable to control flow therethrough. The valve element 342 can have a hole, opening or port, through the middle so that when the valve element is "inline", flow will occur in the manner desired.

The supply coupling device in fluid communication with the valve element, the supply coupling device receiving the fuel from one or more supply fuel lines in fluid communication with the main fuel source and providing the fuel to an onboard motor.

When the valve element 342 is in the closed position, the hole can be positioned in a manner (e.g., perpendicular) so that flow can be blocked.

A handle 317 or lever can also be in coordinated or corresponding position with the valve element, thus providing an indication of the position of the valve element.

The supply coupling device 314 can be made of, or include components made of materials indicated herein, including metal, such as steel and stainless steel, plastic, ceramic, and so forth.

In an embodiment, the valve element 342 can be a three-way ball valve that can include "L" or "T"-shaped hole therethrough, as would be apparent to one of skill in the art. The shape of the valve element can dictate the direction of flow depending on the position of the valve element.

Each coupling device, the supply coupling device 314 or the return coupling device 315 can include connection points 344a and 344b and a housing or body 346, along with the handle 317 and the valve element 342.

The connection points 344a and 344b can include threaded, tolerance fit, or other suitable features for connecting to hoses and other fittings.

Figure 5:
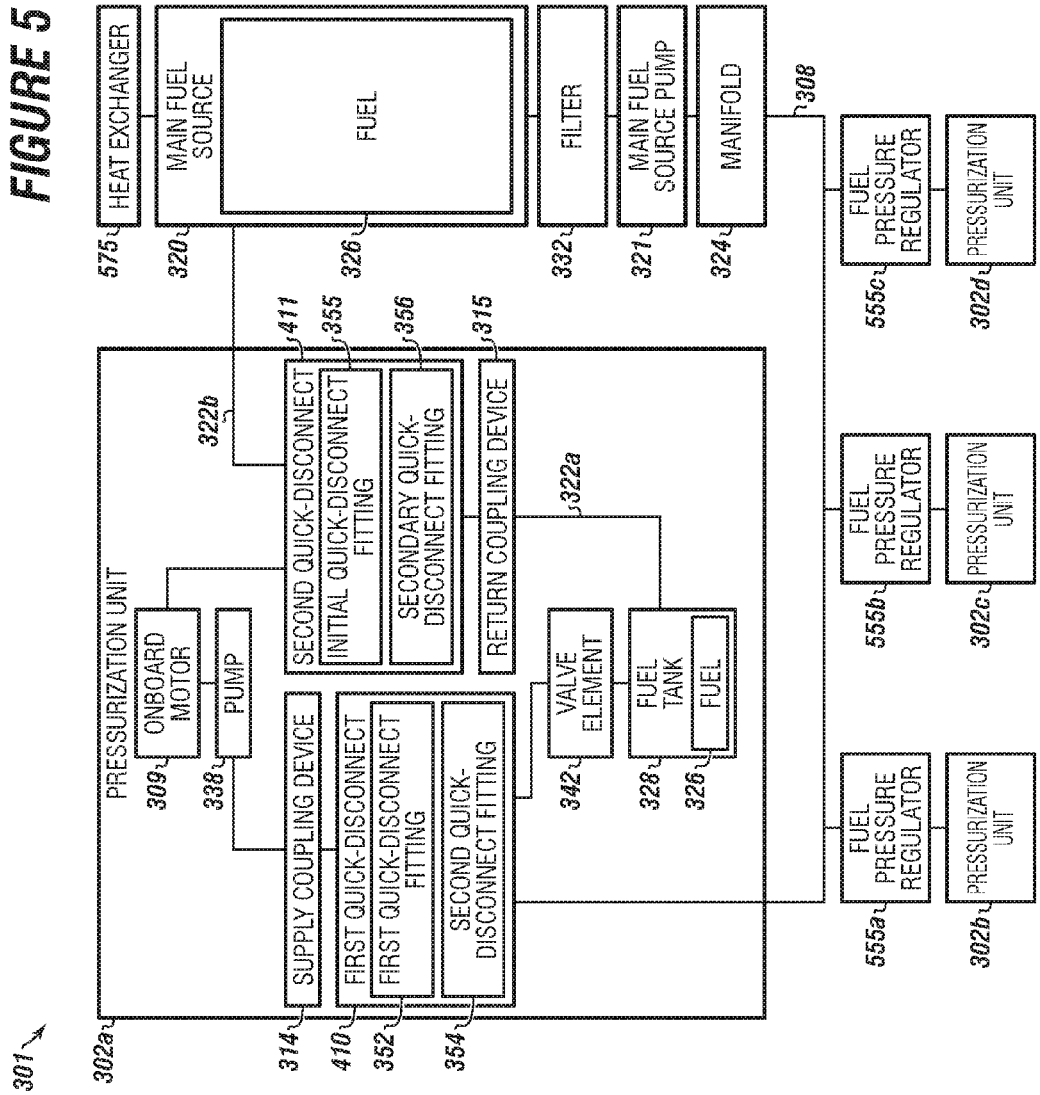
FIG. 5 is a diagram of the components of a refueling system as connected to an onboard motor and a pump containing at least one pressurization unit as connected to a main fuel source and a supply fuel line according to one or more embodiments.

A first quick-disconnect fitting 352 is also shown and described in greater detail in FIG. 5.

Figure 4:
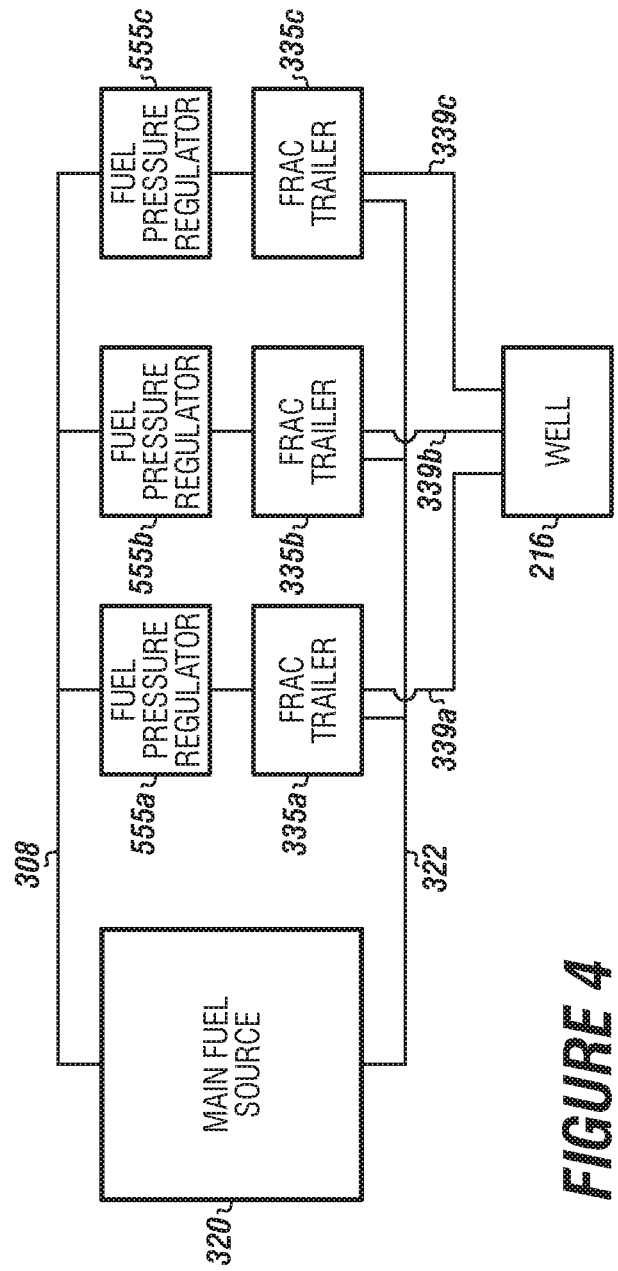
FIG. 4 is a diagram of a refueling system with at least one piece of fracturing equipment pumping fluids down a well connected to the refueling system according to one or more embodiments.

FIG. 4 is a diagram of a refueling system with at least one piece of fracturing equipment pumping fluids down a well connected to the refueling system according to one or more embodiments.

A well 216 is shown into which multiple pieces of fracturing equipment, shown here as frac trailers 335a, 335b, and 335c are pumping fractionation fluid 339a, 339b, and 339c.

The at least one piece of fracturing equipment can be connected to at least one fuel pressure regulator 555a, 555b, and 555c to receive fuel for refueling the at least one piece of fracturing equipment. In embodiments, the refueling of a plurality of fracturing equipment can be done simultaneously.

The at least one fuel pressure regulator can communicate between the one or more supply fuel lines 308 and the supply coupling device for reducing fuel pressure coming from the one or more supply fuel lines 308.

The at least one fuel pressure regulator can communicate between the one or more supply fuel lines 308 and the supply coupling device for reducing fuel pressure coming from the one or more supply fuel lines 308.

The one or more supply fuel lines 308 can flow fuel from the main fuel source 320 to the one or more return fuel lines 322.

FIG. 5 is a diagram of a refueling system with components of the refueling system connected to an onboard motor and a pump containing the at least one pressurization unit further connected to a main fuel source using a supply fuel line for each piece of fracturing equipment according to one or more embodiments.

The refueling system 301 can include the main fuel source 320, which can be fluidly connected to at least one piece of fracturing equipment, wherein each piece of fracturing equipment can provide downhole fluids to a well for fractionation of the well via at least one fuel pressure regulators 555a-555c, which can be connected to the one or more supply fuel lines 308.

The at least one pressurization unit 302a can have the fuel tank 328 containing the fuel 326, the valve element 342 connected to the fuel tank 328, and the supply coupling device 314 connected to the valve element 342.

The supply coupling device 314 can receive the fuel 326 from the fuel tank 328 and the fuel 326 from the one or more supply fuel lines 308 connected to the main fuel source 320 and the refueling method can provide a switchable fuel supply, with an ability to close off fuel from one tank and use fuel from the other tank.

The at least one pressurization unit 302a can include the pump 338, which can be fluidly connected to the supply coupling device 314 for receiving fuel from the supply coupling device 314 and for providing fuel 326 on an onboard motor 309.

The at least one pressurization unit 302a can include the return coupling device 315 for receiving the fuel from the onboard motor 309 and transferring the fuel through a first return fuel line 322a to the main fuel source 320. Excess fuel can transfer through a second return fuel line 322b to the fuel tank 328.

The at least one fuel pressure regulator 555a and 555b can be in communication between the one or more supply fuel lines 308 and the supply coupling device 314 for reducing fuel pressure coming from the one or more supply fuel lines 308. A third fuel pressure regulator 555c can communicate with the second fuel pressure regulator 555b. Each fuel pressure regulator can communicate to a separate pressurization unit.

In embodiments, the supply coupling device 314 can have a first quick disconnect 410 made up of a first quick-disconnect fitting 352 mating to a second quick-disconnect fitting 354. The first quick disconnect 410 can be for accelerated set up and take down of the refueling unit.

In embodiments, the connection points can include or be fitted with the first quick-disconnect fitting 352. The one or more supply fuel lines 308 can include a feed end configured with the second quick-disconnect 354 suitable for mating to the first quick disconnect fitting 352.

The fuel 326 can be combustible fuel, such as gasoline, kerosene, diesel, natural gas, blends, and the like.

It should be noted that one or more return fuel lines 322a and 322b can engage the return coupling device 315 and can enable transfer of the fuel to the fuel tank 328 when a system failure prevents the main fuel source 320 from supplying fuel to the supply coupling device.

In embodiments, the fuel can be transferred in a first portion and a second portion, which can be done simultaneously.

In embodiments, additional return fuel lines 322c can be used.

The refueling system can have a second quick disconnect 411 made up of an initial quick-disconnect fitting 355 mating to a secondary quick-disconnect fitting 356 for accelerated set up and take down of the refueling unit.

The refueling system can have a manifold 324 connected between the one or more supply fuel lines 308 and the main fuel source 320 for enabling additional supply lines to connect, which can provide multiple supply fuel lines simultaneously enabling a plurality of fractionation trucks, such as eight, per supply fuel line to be refueled simultaneously per fuel supply line.

The refueling system can have a main fuel source pump 321 connected to the main fuel source 320 for pumping the fuel 326 from the main fuel source through the filter 332 to the manifold 324.

A heat exchanger 575 can be mounted to the main fuel source 320 for receiving fuel from the main fuel source and continuously regulating the temperature of the fuel to an optimal operating temperature for the onboard motor 309.

It should be noted that the valve element 342 can stop fuel flow from the fuel tank 328 when the main fuel source supplies fuel to the supply coupling device and can automatically start flow of fuel from the fuel tank 328 to the pump 338 when a system failure prevents the main fuel source 320 from supplying fuel to the supply coupling device 314.

In embodiments, the valve element 342 can be a check valve, a spring loaded check valve, a ball valve, a two way valve, a shuttle valve, a butterfly valve, a gate valve, a three way valve, or any suitable valve known in the industry.

In embodiments, additional pressurization units 302b, 302c and 302d can be used. In embodiments the additional pressurization units can be a plurality of pressurization units.

In embodiments, the fuel tank 328 can be fixedly connected or otherwise coupled to the at least one pressurization unit 302a. In embodiments, the at least one pressurization unit 302a can include a plurality of fuel tanks, such as for redundancy and backup purposes.

The fuel tank 328 can be configured to supply fuel to the motor and selectively receive or supply fuel to a second fuel tank on a second unit, such as through a fuel pump.

In embodiments, the at least one pressurization unit 302a can include switches, buttons, keyboards, interactive displays, levers, dials, remote control devices, voice activated controls, electronic controls, displays, operator input devices, processors, memory, and/or electronic, electrical communicative and/or digital input and output ports into one device or any other input device that a person skilled in the art would understand would be functional in the disclosed embodiments in the furtherance of the operation of the at least one pressurization unit 302a.

In embodiments, the filter can be configured to remove particulates in the fuel lines, water, and water based contaminants in the fuel. In embodiments the removal of particulates can include particulates that have diameters from 3 microns to 30 microns and can remove at least 80 percent water and water based contaminants in the fuel.

Figure 6:
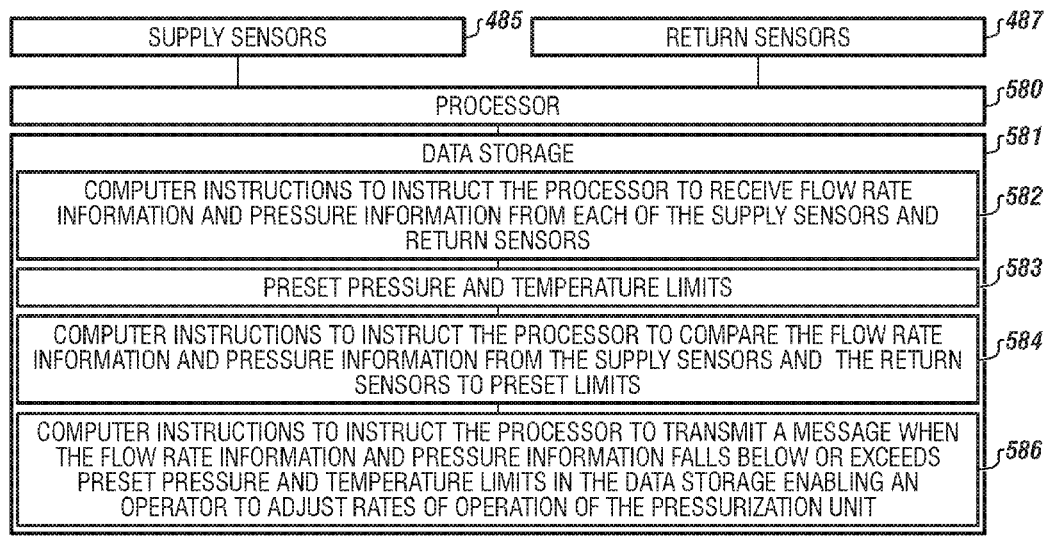
FIG. 6 is a diagram of a controller for a refueling system having a processor connected to sensors and a data storage according to one or more embodiments.

FIG. 6 is a diagram of a controller for a refueling system having a processor connected to sensors and to data storage according to one or more embodiments.

The controller 579 can include one or more supply sensors 485 and one or more return sensors 487

The one or more supply sensors can be in the one or more supply fuel lines and the one or more return sensors can be in the one or more return fuel lines.

A processor 580, such as a computer, can communicate with the sensors and can receive data from the sensors.

The processor 580 can be in communication with a data storage 581, wherein the data storage can contain various computer instructions. Computer instructions in the data storage can instruct the processor to perform and complete various tasks.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The data storage 581 can contain computer instructions 582, which can instruct the processor to receive flow rate information and pressure information from each of the supply sensors and return sensors.

The data storage 581 can contain preset pressure and temperature limits 583. In embodiments, the preset pressure and temperature limits can be for the fuel.

The data storage 581 can contain computer instructions 584, which can instruct the processor to compare the flow rate information and pressure information from the supply sensors and return sensors to preset pressure and temperature limits.

The data storage 581 can contain computer instructions 586, which can instruct the processor to transmit a message when the flow rate information and pressure information falls below or exceeds preset pressure and temperature limits in the data storage enabling an operator to adjust rates of operation of one or more pressurization units.

In embodiments, the pressurization unit on fracturing equipment or fractionation trailers can each include a controller, thus providing structures or other subcomponents suitable for mounting electronic controls for controlling the pressurization unit. Thus, all components and parts of the pressurization unit can be mounted with sensors and other controller circuitry, which can be operably connected with the controller. The controller can include a cover and such accessories as mounting hardware, brackets, locks, and conduit fittings. The controller can be mounted on the pressurization unit.

The pressurization unit can include other attachments than shown and described that can also be fixedly attached to the frame, such as a fan (not shown), a heat exchange, and/or batteries (not shown).

The controller can include a processor and a memory component. The processor can be a microprocessor or other processors as known in the art. In some embodiments the processor can be made up of multiple processors. The processor can execute instructions for generating a fuel transfer signal and controlling fuel transfer between the fuel tanks. Such instructions can be read into or incorporated into a computer readable medium, such as the memory component or provided external to processor. In alternative embodiments, hard-wired circuitry can be used in place of or in combination with software instructions to implement a fuel transfer method. Thus, embodiments are not limited to any specific combination of hardware circuitry and software.

FIG. 7 is a diagram of a method for supplying fuel to fracturing equipment according to one or more embodiments.

The method can include installing a main fuel source, containing fuel, at a fractionation operation, illustrative in box 500.

The main fuel source can contain any fuel known in the art and usable with the invention, such as gasoline, kerosene, diesel, natural gas, blends, and the like.

The method can include fluidly connecting the main fuel source to at least one piece of fracturing equipment, wherein the fracturing equipment can provide downhole fluids to a well, illustrative in box 502.

The method can include fluidly connecting at least one pressurization unit to the main fuel source, illustrative in box 504.

The method can include using the valve element to stop the fuel flow from the fuel tank when the main fuel source supplies the fuel to the supply coupling device and allows the fuel flow from the fuel tank to the pump when a system failure prevents the main fuel source from supplying the fuel to the supply coupling device, illustrative in box 506.

The method can include using the return fuel line with the return coupling device for the transfer of the fuel to the fuel tank when a system failure prevents the main fuel source supplying the fuel to the supply coupling device, illustrative in box 508.

In an alternative method, the refueling method for supplying fuel to at least one piece of fracturing equipment can include installing a main fuel source at a fractionation operation, wherein the main fuel source contains the fuel, fluidly connecting the main fuel source to the at least one piece of fracturing equipment, wherein the at least one piece of fracturing equipment provides downhole fluids to a well, and fluidly connecting at least one pressurization unit to the main fuel source. The at least one pressurization unit can include a supply coupling device connected to an onboard motor, the supply coupling device for receiving the fuel from the main fuel source through one or more supply fuel lines from the main fuel source and a return coupling device for receiving the fuel from the onboard motor and transferring the fuel through one or more return fuel lines to the main fuel source. The refueling method can include using gravity to feed the fuel from the supply coupling device to the onboard motor, and using the one or more return fuel lines with the return coupling device for the transfer of the fuel to the main fuel source.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications to the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be with the scope of any claim. Use of broader terms such as comprises, includes, having, should be understood to provide support for narrower terms such as consisting of, consisting essentially of, comprises substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

Specific structural and functional details disclosed herein are not to be interpreted as limiting, but merely as a basis of the claims and as a representative basis for teaching persons having ordinary skill in the art to variously employ the present invention.

While these embodiments have been described with emphasis on the embodiments, it should be understood that within the scope of the appended claims, the embodiments might be practiced other than as specifically described herein.

What is claimed is:

1. A refueling method for supplying fuel to at least one piece of fracturing equipment, the method comprising:
   a) installing a main fuel source at a fractionation operation, wherein the main fuel source contains the fuel;
   b) fluidly connecting the main fuel source to the at least one piece of fracturing equipment, wherein the at least one piece of fracturing equipment provides downhole fluids to a well;
   c) fluidly connecting at least one pressurization unit to the main fuel source, wherein the at least one pressurization unit comprises:
      i. a fuel tank containing the fuel;
      ii. a valve element in fluid communication with the fuel tank;
      iii. a supply coupling device in fluid communication with the valve element, the supply coupling device for receiving the fuel from one or more supply fuel lines in fluid communication with the main fuel source and providing the fuel to an onboard motor;
      iv. a return coupling device for receiving the fuel from the onboard motor and transferring the fuel through one or more return fuel lines to the main fuel source; and
      v. at least one fuel pressure regulator, wherein the at least one fuel pressure regulator is in fluid communication with the one or more supply fuel lines and the supply coupling device for reducing fuel pressure coming from the one or more supply fuel lines;
   d) using the valve element to stop a fuel flow from the fuel tank when the main fuel source supplies the fuel to the supply coupling device and allows the fuel flow from the fuel tank to the at least one pressurization unit when a system failure prevents the main fuel source from supplying the fuel to the supply coupling device; and
   e) using the one or more return fuel lines with the return coupling device for the transfer of the fuel to the fuel tank when a system failure prevents the main fuel source from supplying the fuel to the supply coupling device.

2. The refueling method of claim 1, comprising using a first quick disconnect having a first quick disconnect fitting mating to a second quick disconnect fitting for an accelerated set up and take down of the refueling unit.

3. The refueling method of claim 2, comprising using a second quick disconnect having an additional first quick disconnect fitting mating to an additional second quick disconnect fitting for accelerated set up and take down of the refueling unit.

4. The refueling method of claim 1, comprising installing a manifold between the one or more supply fuel lines and the main fuel source connected to multiple supply fuel lines enabling the at least one piece of fracturing equipment per supply fuel line to be refueled per line.

5. The refueling method of claim 4, further comprising installing a main fuel source pump connected to the main fuel source for pumping the fuel from the main fuel source through a filter to the manifold.

6. The refueling method of claim 1, wherein the valve element is a check valve, a spring loaded check valve, a ball valve, a two way valve, a shuttle valve, a butterfly valve, a gate valve, or a three way valve.

7. The refueling method of claim 1, comprising mounting a heat exchanger to the main fuel source to receive the fuel from the main fuel source and continuously regulate the temperature of the fuel at to an optimal operating temperature for the onboard motor.

8. The refueling method of claim 1, comprising installing a controller containing at least one processor in the at least one pressurization unit and connecting the at least one processor to sensors installed on the one or more supply fuel lines and sensors installed on the one or more return fuel lines, using the at least one processor to receive flow rate information and pressure information and to compare the flow rate information and pressure information to preset limits in a data storage connected to the at least one processor, and then transmit a message when the flow rate information and pressure information falls below or exceeds the preset limits to a client device via a network to enable a user to adjust rates of operation.

9. The refueling method of claim 5, comprising using the filter to remove particulates, water and water based contaminates flowing through the filter.

10. The refueling method of claim 8, wherein the controller comprises:
    a) at least one supply sensor in the one or more supply fuel lines;
    b) at least one return sensor in the one or more return fuel lines;
    c) the at least one processor configured to receive data from the at least one supply sensor, the at least one return sensor, or from both the at least one supply sensor and the at least one return sensor;
    d) the data storage in communication with the at least one processor;

e) computer instructions in the data storage to instruct the at least one processor to receive the flow rate information and pressure information from the at least one supply sensor, the at least one return sensor, or from both the at least one supply sensor and the at least one return sensor;

f) preset pressures for the fuel flow and preset temperature limits for the fuel in the data storage as preset pressure and preset temperature limits;

g) computer instructions in the data storage to instruct the at least one processor to compare the flow rate information and pressure information from the at least one supply sensor, the at least one return sensor, or from both the at least one supply sensor and the at least one return sensor to the preset pressure and the preset temperature limits; and h) computer instructions in the data storage to instruct the at least one processor to transmit a message when the flow rate information and pressure information falls below or exceeds the preset pressure and preset temperature limits in the data storage enabling an operator to adjust the rates of the operation of the at least one pressurization unit.

11. The refueling method of claim 1, wherein the valve element has at least one sensor for sensing when the preset pressure and preset temperature limits fall below or exceed the preset pressure and preset temperature limits, actuating the valve element to change the flow of the fuel from the main fuel source to the fuel tank.

12. A refueling method for supplying fuel to at least one piece of fracturing equipment, the method comprising:

a) installing a main fuel source at a fractionation operation, wherein the main fuel source contains the fuel;

b) fluidly connecting the main fuel source to the at least one piece of fracturing equipment, wherein the at least one piece of fracturing equipment provides downhole fluids to a well;

c) fluidly connecting at least one pressurization unit to the main fuel source, wherein the at least one pressurization unit comprises:
   i. a supply coupling device connected to an onboard motor, the supply coupling device for receiving the fuel from the main fuel source through one or more supply fuel lines from the main fuel source; and
   ii. a return coupling device for receiving the fuel from the onboard motor and transferring the fuel through one or more return fuel lines to the main fuel source;

d) using gravity to feed the fuel from the supply coupling device to the onboard motor; and e) using the one or more return fuel lines with the return coupling device for the transfer of the fuel to the main fuel source.

* * * * *